United States Patent [19]

Saika et al.

[11] Patent Number: 5,703,666
[45] Date of Patent: Dec. 30, 1997

[54] ELECTROLUMINESCENT DEVICE FOR ILLUMINATING A LIQUID CRYSTAL DISPLAY

[75] Inventors: Toshihiro Saika, Zama; Hidemasa Mizutani, Sagamihara; Noriyuki Kaifu, Hachioji; Toshio Kameshima, Atsugi, all of Japan

[73] Assignee: Canon Kabushiki Kaisha, Tokyo, Japan

[21] Appl. No.: 512,697

[22] Filed: Aug. 8, 1995

Related U.S. Application Data

[62] Division of Ser. No. 294,361, Aug. 23, 1994, Pat. No. 5,486,738, which is a division of Ser. No. 934,326, Aug. 25, 1992, Pat. No. 5,384,456.

[30] Foreign Application Priority Data

Aug. 29, 1991 [JP] Japan ................... 3-242461
Aug. 30, 1991 [JP] Japan ................... 3-244159

[51] Int. Cl.⁶ .................................................. G02F 1/1335
[52] U.S. Cl. ....................................... 349/61; 315/169.3
[58] Field of Search .......................... 359/48; 315/169.3; 313/591; 349/61

[56] References Cited

U.S. PATENT DOCUMENTS

| | | | |
|---|---|---|---|
| 3,604,938 | 9/1971 | Kohashi et al. | 250/213 R |
| 3,699,374 | 10/1972 | Scholl et al. | 313/94 |
| 3,975,661 | 8/1976 | Kanatani et al. | 315/169 TV |
| 4,027,192 | 5/1977 | Hanak | 313/498 |
| 4,126,384 | 11/1978 | Goodman et al. | 359/48 |
| 4,138,195 | 2/1979 | Saurer et al. | 359/48 |
| 4,208,869 | 6/1980 | Hanaoka | 359/48 |
| 4,238,793 | 12/1980 | Hochstrate | 359/48 |
| 4,580,877 | 4/1986 | Washo | 359/48 |
| 4,743,808 | 5/1988 | Mitsumori | 315/169.3 |
| 5,121,234 | 6/1992 | Kucera | 359/48 |
| 5,164,580 | 11/1992 | Funada et al. | 250/208.1 |

FOREIGN PATENT DOCUMENTS

| | | | |
|---|---|---|---|
| De. 3738414 | 5/1989 | Germany | 359/48 |
| 59-37530 | 3/1984 | Japan | 359/48 |
| 62-52533 | 3/1987 | Japan | 359/48 |
| 62-200326 | 9/1987 | Japan | 359/48 |
| 1-188894 | 7/1989 | Japan | 359/48 |
| 4-40413 | 2/1992 | Japan | 359/48 |
| 5-186561 | 7/1994 | Japan | 359/48 |
| 2 225 894 | 6/1990 | United Kingdom | 359/48 |

*Primary Examiner*—William L. Sikes
*Assistant Examiner*—James A. Dudek
*Attorney, Agent, or Firm*—Fitzpatrick, Cella, Harper & Scinto

[57] ABSTRACT

A liquid crystal device has a light source and liquid crystal elements which selectively transmit light emitted by the light source. The liquid crystal device comprises: the light source, being an electroluminescent device, having a transparent electrode disposed on a light output side of the light source, an electrode opposite to the transparent electrode, and an electroluminescence emission layer interposed between the transparent electrode and the opposite electrode; voltage supply means connected to the transparent electrode in order to feed a reference voltage to the transparent electrode; and driving voltage application means for applying a driving voltage to the opposite electrode. The driving voltage application means comprises a separate excitation type driving circuit using the capacitance of the electroluminescent device itself to produce an alternating current, and pulse generating means for generating a pulse responsive to an input signal to turn on and off a switch of the separate excitation type driving circuit. The pulse generating means includes a multivibrator and a capacitor and a resistor determine the width of the pulse.

2 Claims, 14 Drawing Sheets

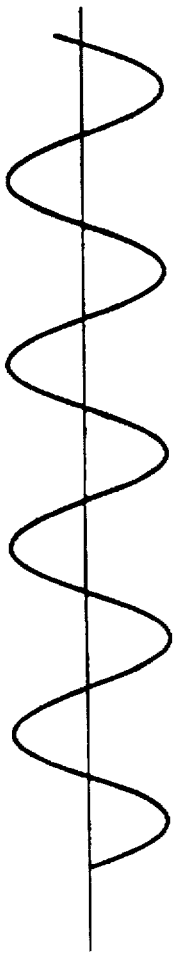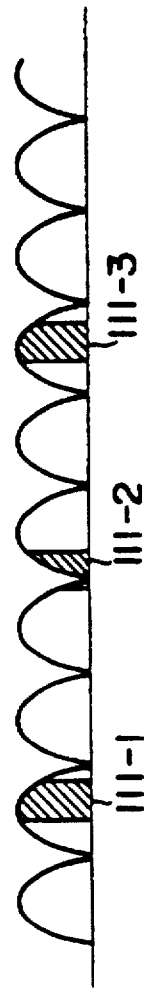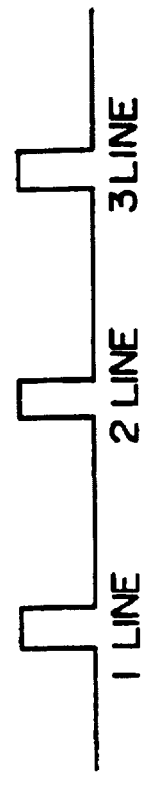
FIG. 7(a) SELF-EXCITEMENT INVERTER VOLTAGE 110
FIG. 7(b) EL LIGHT QUANTITY 111
FIG. 7(c) READING SENSOR STORAGE TIMING 112

FIG. 8(a)
SELF-EXCITEMENT TYPE INVERTER VOLTAGE 110'
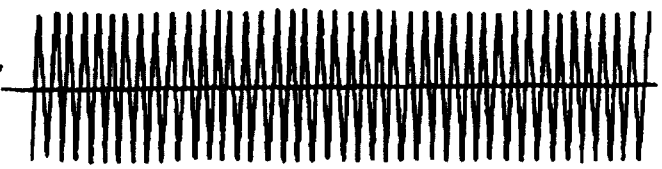
FIG. 8(b)
EL LIGHT QUANTITY 111'
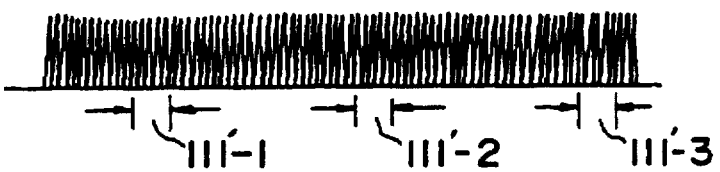
FIG. 8(c)
READING SENSOR STORAGE TIMING 112'
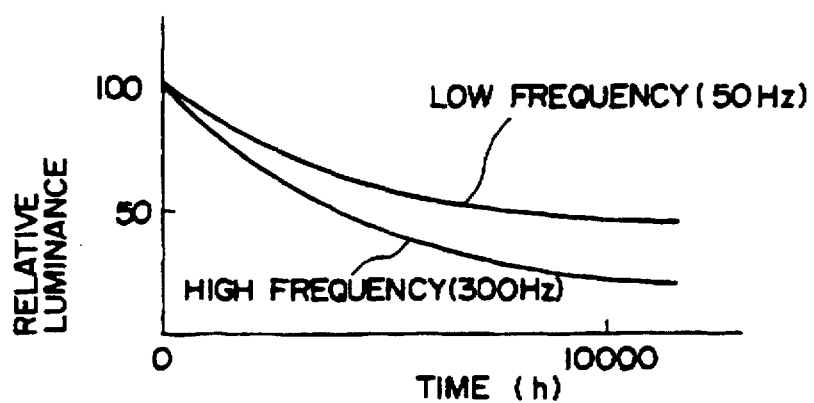
FIG. 9

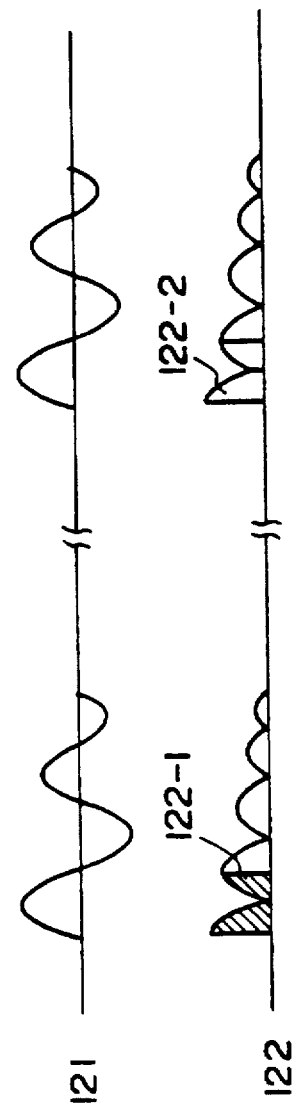
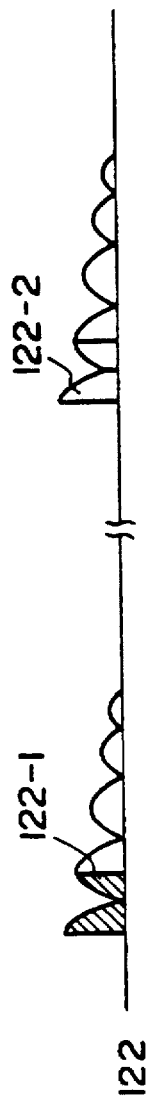
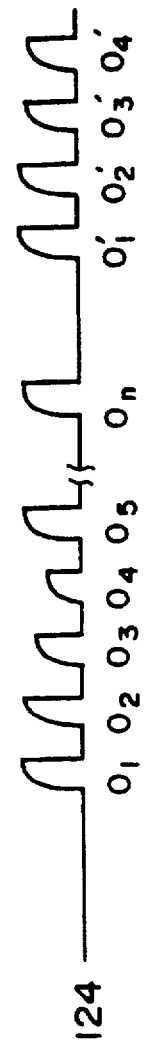
FIG. 14(a) SYNCHRONIZING SIGNAL
FIG. 14(b) EL DRIVING PULSE
FIG. 14(c) VOLTAGE BETWEEN EL ELECTRODES
FIG. 14(d) EL LIGHT EMISSION QUANTITY
FIG. 14(e) SENSOR DRIVING PULSE
FIG. 14(f) SENSOR OUTPUT WAVE FORM

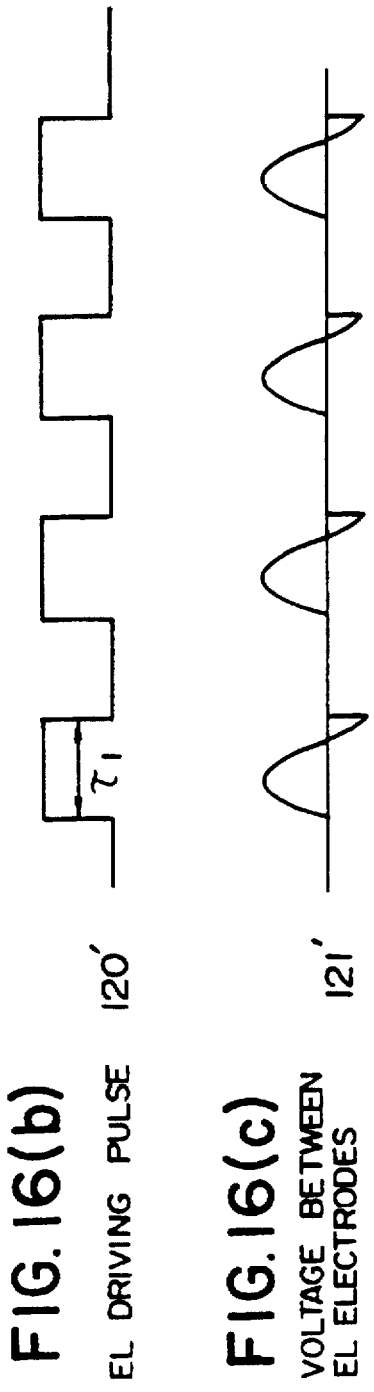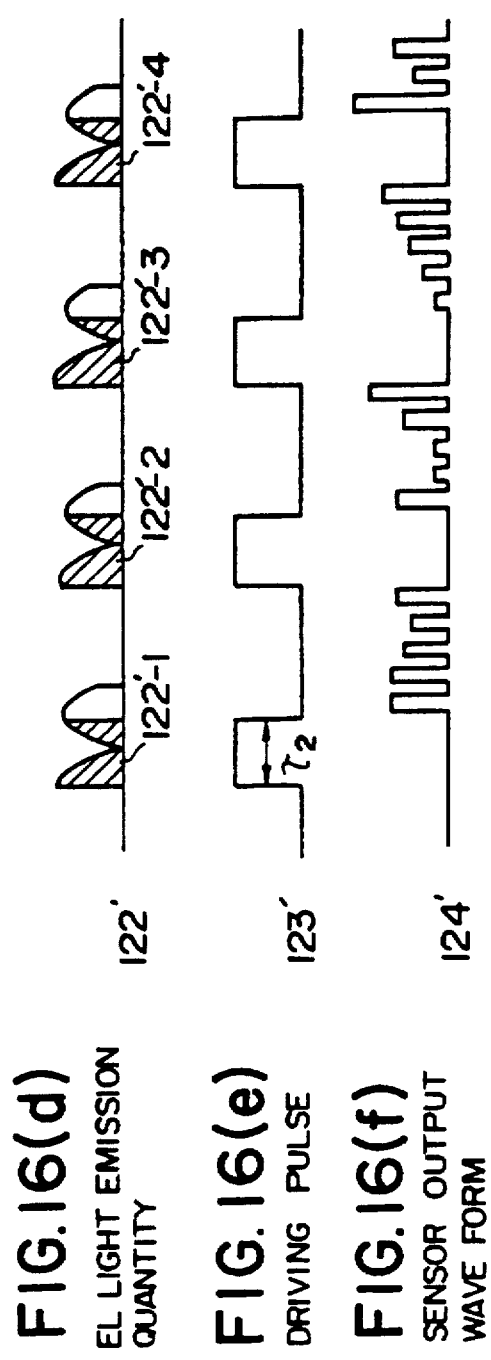
FIG. 16(a) SYNCHRONIZING SIGNAL 119'
FIG. 16(b) EL DRIVING PULSE 120'
FIG. 16(c) VOLTAGE BETWEEN EL ELECTRODES 121'
FIG. 16(d) EL LIGHT EMISSION QUANTITY 122'
FIG. 16(e) DRIVING PULSE 123'
FIG. 16(f) SENSOR OUTPUT WAVE FORM 124'

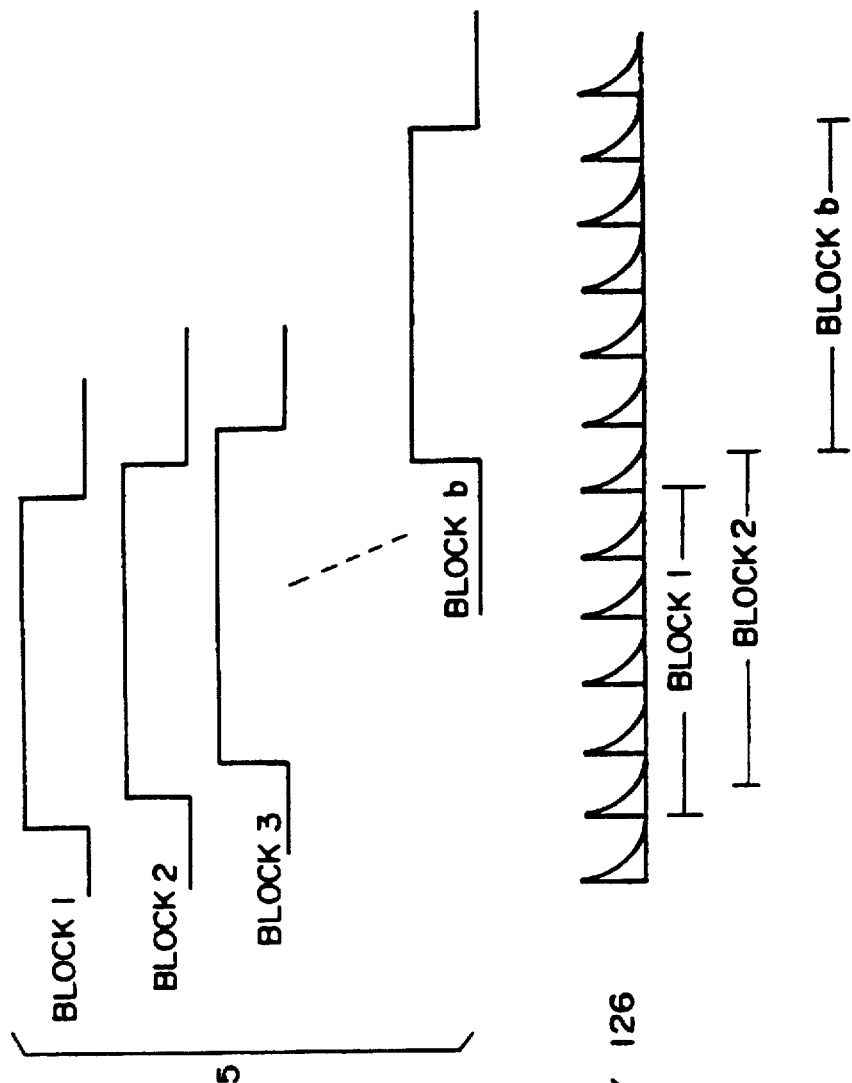

ELECTROLUMINESCENT DEVICE FOR ILLUMINATING A LIQUID CRYSTAL DISPLAY

This application is a division of application Ser. No. 08/294,361 U.S. Pat. No. 5,486,738, filed Aug. 23, 1994, which is a divisional of application Ser. No. 07/934,326 U.S. Pat. No. 5,384,456, filed Aug. 25, 1992.

BACKGROUND OF THE INVENTION

1. Field of the Invention

The present invention relates to an electroluminescent device (hereinafter referred to as "EL device") for use in a liquid crystal display device or an image sensor for the purpose of generating illumination light, and to the image sensor which employs such an EL device.

2. Related Background Art

An image processing system such as a facsimile machine, a copying machine, or a computer peripheral device like an image reading apparatus, employs an image sensor for picking up an image or a liquid crystal device for displaying an image.

With electronic office machines widely in use today, there is a growing need for a compact and low cost image sensor or liquid crystal device. One type of image sensor, for example, is the equal magnification image sensor which may be placed in direct contact with an original document in use, without an image formation system included or with an image formation system, if included, having a short optical path.

In a contact type image sensor with so-called selfoc lens, an illumination system and a sensor system are disposed closely to each other. In the above quoted full contact image sensor without lens, a document is illuminated through a glass base plate, and thus a sensor system is even more closely disposed to a light source. One of the illumination systems employed in such a device is an LED array. To ensure a uniform illumination level across the full width of the document, an LED array must be compactly arranged. This increases the cost of the image sensor. To achieve a uniform illumination level even with a coarsely arranged array of LED, the illumination system must be placed substantially apart from the document. A desirable compact design of the sensor will not be achieved using such an arrangement. In view of these requirements, a surface light source EL device may be recognized as a promising candidate as a light source for an image sensor.

As shown in FIG. 1, for example, an image sensor with an EL device comprises a transparent plate 1 made of glass or the like, wherein the transparent plate 1 supports a photoelectric transfer section formed of a thin film photosensor array 10 made of amorphous silicon (hereinafter referred to as "a-Si") and the like, storage capacitances, and thin film transistors (not shown). The transparent plate 1 has, on its top portion, a transparent insulating layer 2 serving as a spacer against an original document. An EL device 30 (not shown) is disposed beneath the transparent plate 1. The EL device 30 is glued onto the underside of the transparent plate 1 with an adhesive (not shown). As an alternative to the adhesive, a clamp member (not shown) may be employed to secure the EL device 30 onto the transparent plate 1.

The EL device 30 is of a sandwich structure, wherein a metal electrode 32, an insulating layer 33, an EL emission layer 34, an insulating layer 33', and a transparent electrode 35 are stacked in that order from the bottom up onto a substrate 31. A protective film 36 covers the sandwich structure of the EL device 30. A driving signal is applied between the metal electrode 32 and the transparent electrode 35 (i.e., between terminals O and O'), and light is emitted by the EL emission layer 34 sandwiched between the electrodes.

The light emitted by the EL emission layer 34 is transmitted through the transparent electrode 35, the transparent plate 1, and the transparent insulating layer 2, and then reaches a document 100. Light 50, reflected in response to the image on the document 100, enters the photosensor array 10 of the photoelectric transfer section. In response to the incident light, a photoelectric current is generated in the photosensor array 10.

When an EL device constructed as mentioned above is employed as a source of light in an image reading apparatus, the photoelectric transfer section is disposed close to the metal electrode 32 and the transparent electrode 35, both of which serve as the driving electrodes for the EL device. Employed to drive the EL device 30 is a supply voltage with its amplitude ranging from ±100 V to ±250 V, its frequency ranging from 50 Hz to 5 kHz, and its waveform as shown in FIG. 2. An electric field appears between the photoelectric transfer section and the EL device 30, becoming a source of noise affecting signals such as a photoelectric current flowing in the photosensor and a voltage of the storage capacitance.

Since the level of the signal derived from the photoelectric current is extremely low, the above described noise affects greatly the output signal from the photoelectric transfer section, thereby presenting a difficulty in accurately picking up a line of image data from the document.

In an attempt to solve the above problem, the inventors of the present invention interposed, between an EL device 30 and a photoelectric transfer section, a transparent conductive layer 40 which is grounded as shown in FIG. 3. This arrangement, however, proved costly.

The same problem arises in a liquid crystal display apparatus, with noise originating in an EL device disturbing a presented image on its display.

Apart from the above problem, the design of an image sensor with an EL device is associated with another problem as described below.

FIG. 4 illustrates a driving circuit for a conventional EL device. In the circuit, the EL device is driven by a self-excitement type inverter which outputs a signal with a constant frequency and a constant voltage to a transformer 9.

Commonly used image sensors employ a CCD type sensor, or a charge storage type sensor made of amorphous silicon or the like. The charge storage type sensor integrates, over a unit time, charge in response to picture information containing light, such as light scattered from the surface of a document, stores in a capacitor a corresponding charge and converts this picture information to a voltage level for processing.

FIG. 5 illustrates a conventional EL device and the circuit of a photoelectric transfer device using an image sensor. FIG. 6 is a cross-sectional view showing roughly this photoelectric transfer device. The image sensor illustrated in FIG. 5 comprises an EL device 30 as a light source, a self-excitement type inverter 20 having a transformer 9, a plurality of storage type photosensors 3 arranged in a row, a sensor driving device 4 and an output signal processing circuit 5.

Storage type photosensors S1–Sn are arrayed, with n representing the total number of photosensors. For example, when n, is set up to give a resolution of 8 pixels/mm, a sheet size of A4 includes 1728 bits of information, and a sheet size of B4 includes 2048 bits of information. These photosensors S1–Sn have power supplied by a sensor bias voltage supply 6. As shown in FIG. 6, light emitted alternately by the EL device 30 is directed to a document 7, and scattered by the surface of the document in response to the picture information of the document. The scattered light 50 then enters the storage type photosensors 3.

The pulse supplied by the sensor driving device 4 causes SW1–SWn in the storage photosensors 3 to simultaneously be closed. Throughout this period, each of capacitors C1 through Cn stores each charge corresponding to the integrated value of each scattered light signal entering each of S1 through Sn. After stored charges are converted into voltages, the output signal processing circuit 5 outputs them sequentially to complete a reading operation over a full width of a line.

In the above-described arrangement where a photoelectric transfer device is made of an EL device, a self-excitement type inverter, storage type reading sensors, a sensor driving device and an output signal processing circuit, integrated values of light quantities of the illumination of the document 111-1, 111-2 and 111-3 suffer variations when a storage timing 112 determined by the sensor driving device fluctuates as shown in FIGS. 7(a)–(c), thereby deteriorating the consistency of the sensors' responses.

As illustrated in FIGS. 8(a)–(c), when the EL device is driven by a signal 110' whose frequency is high enough to make insignificant the error caused by fluctuations in the storage timing 112' of the reading sensor, the luminance characteristics of the EL device itself deteriorate rapidly, as expressed by the relationship between the driving frequency of the EL device and the resultant luminance of the EL device as in FIG. 9. Also, high frequency component noises develop, adversely affecting a resulting image. Furthermore, commonly used self-excitement type inverters are bulky in their volume, and contain a costly transformer. This presents a difficulty in implementing a compact and low cost design into an image sensor.

SUMMARY OF THE INVENTION

It is a first object of the present invention to provide an EL device, an image sensor and a liquid crystal display device, all of which offer better luminance illumination than conventional devices.

It is a second object of the present invention to provide a compact, low-cost image sensor in which the output of a photoelectric transfer section is not adversely affected by the driving signal for an EL device, and in which the EL device capable of suppressing the effect of noise, even if the EL device is disposed close to the photoelectric transfer section.

It is a third object of the present invention to provide a compact, low-cost image sensor which is free from storage type sensors' inconsistent responses arising from fluctuations in the sensors' storage timing and free from the deterioration of luminance output of an EL device in connection with a high driving frequency for light emission.

It is a fourth object of the present invention to provide an EL device which emits light by applying a voltage between two electrodes between which an EL emission layer is interposed, said EL device comprising a transparent electrode as one of the two electrodes on one side of the EL emission layer, whereby electroluminescence is performed by connecting the transparent electrode to a power supply for a reference voltage and by providing the other electrode with a driving voltage.

It is a fifth object of the present invention to provide an EL device comprising a first electrode, a second electrode and an EL emission zone, the EL emission zone being made of a first EL emission layer, a second EL emission layer, and a transparent electrode which is interposed between the first EL emission layer and the second EL emission layer, at least either the first electrode or the second electrode being a transparent electrode, whereby the first EL emission layer and the second EL emission layer emit light by having a driving voltage applied to the transparent electrode with both the first electrode and the second electrode connected to a power supply for a reference voltage.

It is a sixth object of the present invention to provide an image sensor having a light source and a photosensor for receiving light reflected by a document illuminated by the light source, said image sensor comprising: the light source, being an EL device, having a transparent electrode disposed on the light output side of the light source, an electrode opposite to the transparent electrode, and an EL emission layer interposed between the transparent electrode and the opposite electrode; voltage supply means connected to the transparent electrode in order to feed a reference voltage to the transparent electrode; and driving voltage application means for applying a driving voltage to the opposite electrode.

It is a seventh object of the present invention to provide an image sensor having a light source and a photosensor for receiving light reflected by a document illuminated by the light source, said image sensor comprising: the light source having a first electrode, a first EL emission layer disposed atop the first electrode, a transparent electrode disposed atop the first EL emission layer, a second EL emission layer disposed atop the transparent electrode, and a second electrode being transparent and disposed atop the second EL emission layer, the light source being an EL device in which light is emitted from the second electrode side; voltage supply means connected between the first electrode and the second electrode in order to feed a reference voltage to the first electrode and the second electrode; and driving voltage application means for applying a driving voltage to the transparent electrode.

It is an eighth object of the present invention to provide a liquid crystal device having a light source and liquid crystal elements which selectively transmit light emitted by the light source, said liquid crystal device comprising: the light source, being an EL device, having a transparent electrode disposed on the light output side of the light source, an electrode opposite to the transparent electrode, and an EL emission layer interposed between the transparent layer and the opposite electrode; voltage supply means connected to the transparent electrode in order to feed a reference voltage to the transparent electrode; and driving voltage application means for applying a driving voltage to the opposite electrode.

It is a ninth object of the present invention to provide a liquid crystal device having a light source and liquid crystal elements which selectively transmit light emitted by the light source, said liquid crystal device comprising: the light source having a first electrode, a first EL emission layer disposed atop the first electrode, a transparent electrode disposed atop the first EL emission layer, a second EL emission layer disposed atop the transparent electrode, and a second electrode being transparent and disposed atop the second EL emission layer, the light source being an EL device in which light is emitted from the second electrode side; voltage supply means connected between the first electrode and the second electrode in order to feed a reference voltage to the first electrode and the second electrode; and driving voltage application means for applying a driving voltage to the transparent electrode.

It is a tenth object of the present invention to provide an image sensor having a light source and a photosensor array for receiving light reflected from a document to be read, capable of storing charge in response to received light, said image sensor comprising: the light source, being an EL device, capable of emitting an alternate light, and an EL device driving circuit of a separate excitation type whose operation is synchronized with an external pulse, the EL device driving circuit employing capacitance components of the EL device itself, whereby the illumination operation by the EL device is synchronized with the reading operation by the photosensor array.

In an EL device of a type which allows an EL emission layer to emit light by applying a voltage between two electrodes disposed on both sides of the EL emission layer, the EL device according to the present invention is characterized in that the EL emission layer emits light by grounding a transparent electrode which is one of the two electrodes on one side of the EL emission layer, and by supplying a driving voltage to the other electrode.

In an EL device of a type which comprises a first electrode, a second electrode and an EL emission zone made of a transparent third electrode sandwiched between a first EL emission layer and a second EL emission layer, with the EL emission zone interposed between the first electrode and the second electrode, either or both of the first electrode and the second electrode being transparent, the EL device according to the present invention is characterized in that the first and second EL emission layers emit light by grounding the first and second electrodes, and by applying a driving voltage to the third electrode.

The image sensor according to the present invention employs the above described EL device.

According to the present invention, a transparent electrode disposed on one side of an EL emission layer is grounded with the other electrode fed with a driving voltage, so that the grounded electrode works as a shield against noise derived from the driving signal for the EL device, thereby preventing features disposed closely to the EL device from being affected by the noise.

An image reading apparatus having the above EL device as a light source, may dispense with a noise suppressing member, such as the transparent conductive layer 40 as in FIG. 3. Since the grounded electrode may be readily interposed between the EL device and the photoelectric transfer section, even a low-cost design allows a structure in which the noise derived from the EL device is shut off by the grounded electrode so that the output of the photoelectric transfer section is kept free from the noise.

According to the present invention, a first electrode, a second electrode and an EL emission zone made of a transparent third electrode sandwiched between a first EL emission layer and a second EL emission layer, are fabricated with the EL emission zone interposed between the first electrode and the second electrode, the first electrode and/or the second electrode are a transparent electrode, both the first and second electrodes are grounded, the third electrode is fed with a driving voltage, and thus, the first and second EL emission layers emit light; the noise derived from the EL device is shut off by the grounded electrodes so that the output of the photoelectric transfer section is kept free from the noise. Furthermore, since the light, emitted by one EL emission layer, and transmitted through the transparent third electrode, is added to the light emitted by the other EL emission layer, the quantity of output light may be doubled, compared to the prior art.

An image sensor having the above EL device as a light source, may dispense with a noise suppressing member, such as the transparent conductive layer 40 in FIG. 3. Since the grounded electrode may be readily interposed between the EL device and the photoelectric transfer section, even a low-cost design allows a structure in which the noise derived from the EL device is blocked by the grounded electrode so that the output of the photoelectric transfer section is kept free from the noise. Furthermore, in the image sensor, a high luminance characteristic may be achieved in its light source.

An image sensor, according to the present invention, comprises a light source for directing light to a document to be read, and an image reading sensor for receiving picture information containing light reflected from the document, wherein the image reading sensor is a charge storage type sensor which stores charge in response to the picture information, the light source is an EL device capable of emitting light in an alternate manner, an EL device driving circuit of a separate excitation type whose operation is synchronized with an external pulse is provided, and the EL device driving circuit employs capacitance components of the EL device itself, in order that the illumination operation by the EL device is synchronized with the reading operation by the photosensor array.

According to the present invention, a separate excitation type, compact EL device driving apparatus capable of performing a synchronizing operation, is constructed by using capacitance components of the EL device itself, in order that the illumination operation by the EL device is synchronized with the reading operation by the storage type sensor; thus, the integrated value of the light quantity of a document per storage time may be kept constant.

BRIEF DESCRIPTION OF THE DRAWINGS

FIGS. 7(a)–(c) constitute a timing chart illustrating the relationship between the storage timing of the sensor and the light quantity of a document in the conventional image sensor;

FIGS. 8(a)–(c) constitute a timing chart illustrating the relationship between the storage timing of the sensor and the light quantity of a document, in the image sensor having a high frequency self-excitation type inverter;

FIG. 9 is a graph showing the relationship between the driving frequency of an EL device and the deterioration of the light quantity of the EL device in an image sensor;

FIGS. 14(a)-(f) constitute a timing chart illustrating the operation of the image sensor in FIG. 13;

FIGS. 16(a)-(f) constitute a timing chart illustrating the operation of the image sensor in FIG. 15; and FIGS. 17(a) and 17(b) constitute a timing chart illustrating the operation of the image sensor in FIG. 15.

DETAILED DESCRIPTION OF THE PREFERRED EMBODIMENTS

Figure 1:
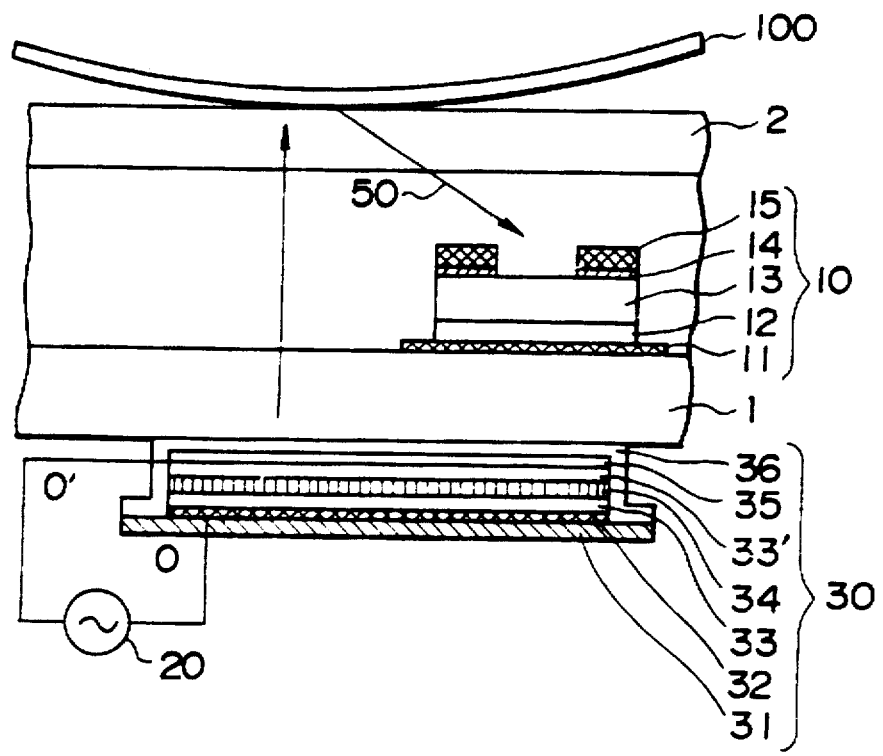
FIG. 1 is a diagrammatic cross-sectional view of a conventional image sensor.
Figure 2:
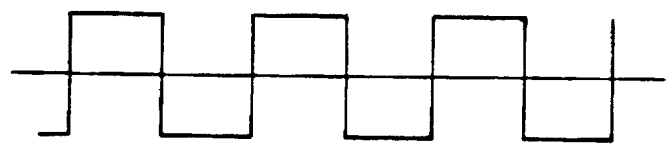
FIG. 2 is a waveform diagram showing the driving signal of the EL device in FIG. 1.
Figure 3:
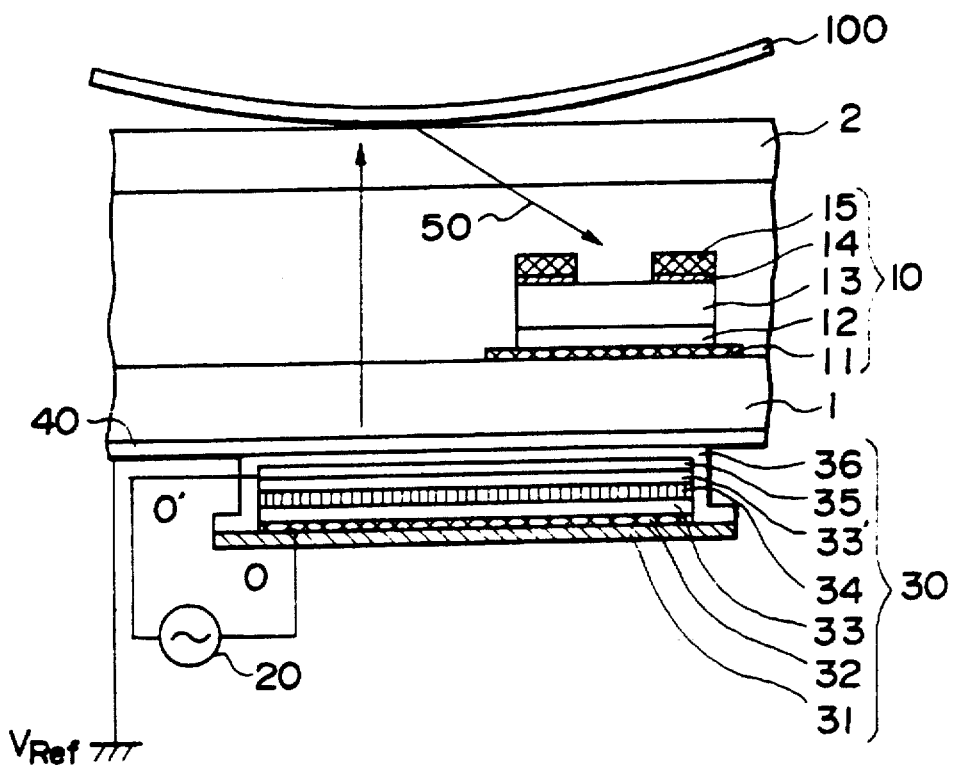
FIG. 3 is a diagrammatic cross-sectional view of one example of an image sensor.
Figure 4:
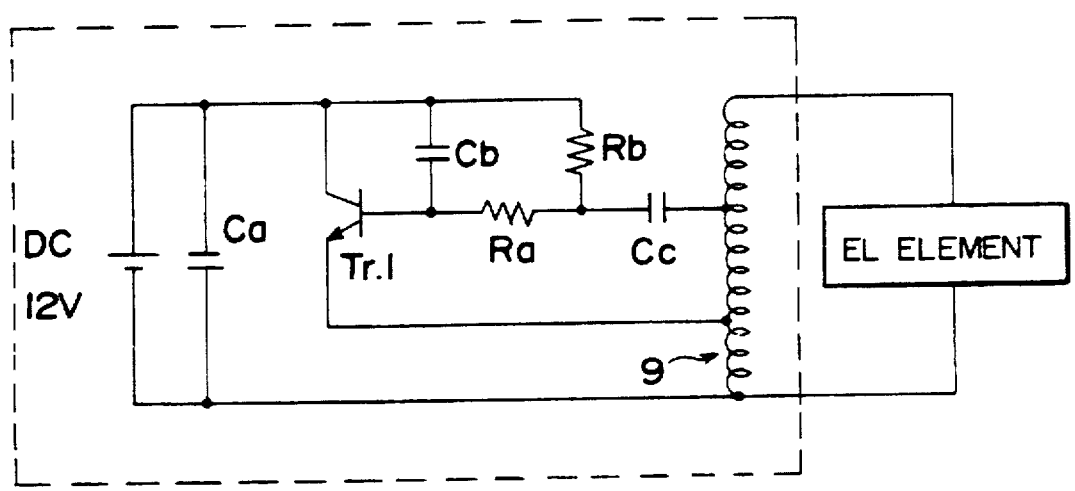
FIG. 4 is a schematic diagram of a self-excitation type inverter of a conventional EL device driving circuit.
Figure 5:
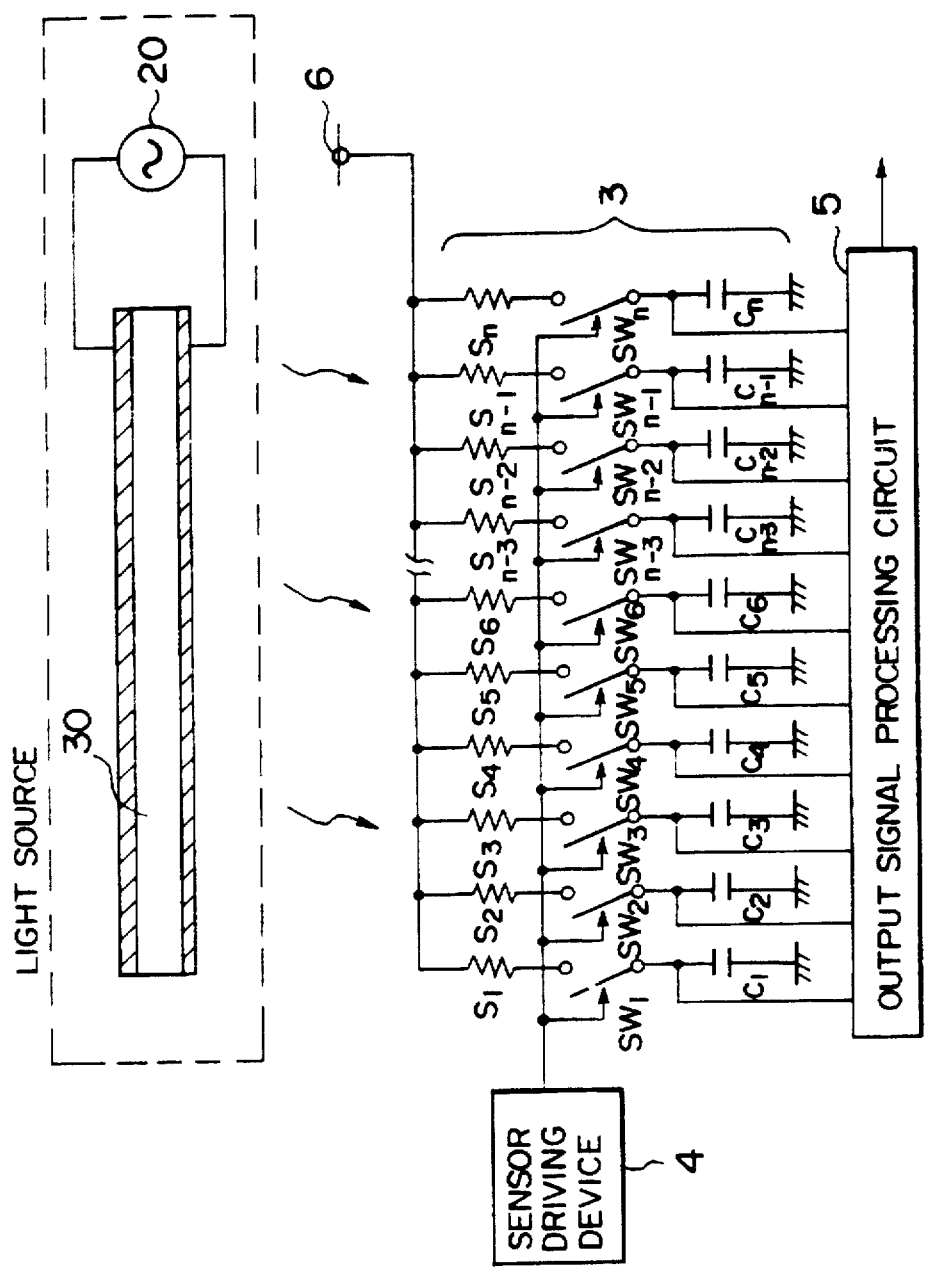
FIG. 5 is a diagram illustrating the image sensor having the conventional EL device.
Figure 6:
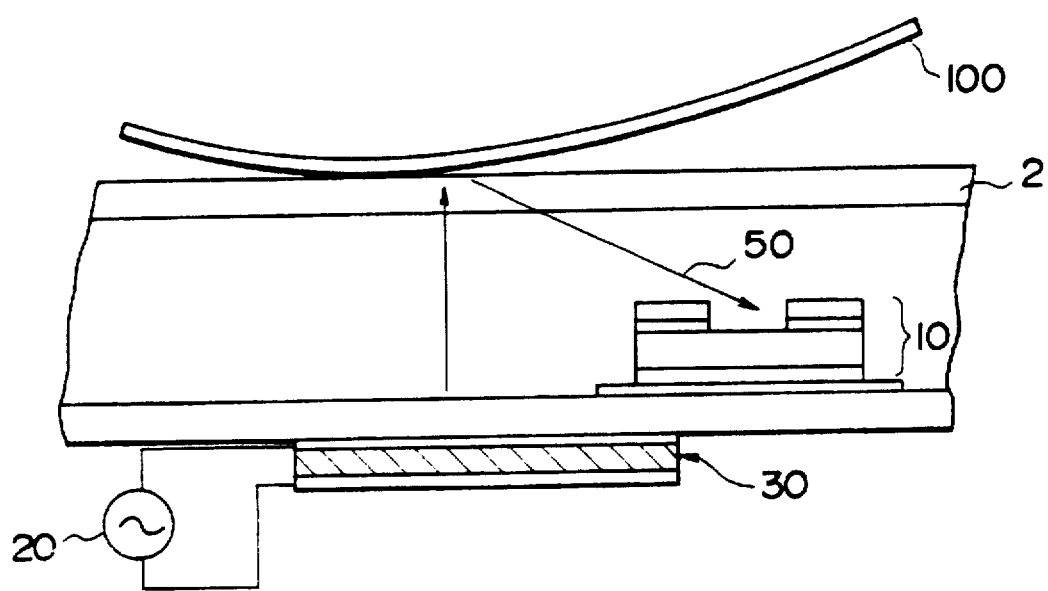
FIG. 6 is a diagrammatic cross-sectional view of the conventional EL device.

Referring now to the drawings, the embodiments of the present invention are described below. The present invention should in no way be limited to the specific embodiments disclosed below. It will be understood that modifications and changes may be made without departing from the scope of the present invention as set forth in the appended claims.

[Embodiment 1]

Figure 10:
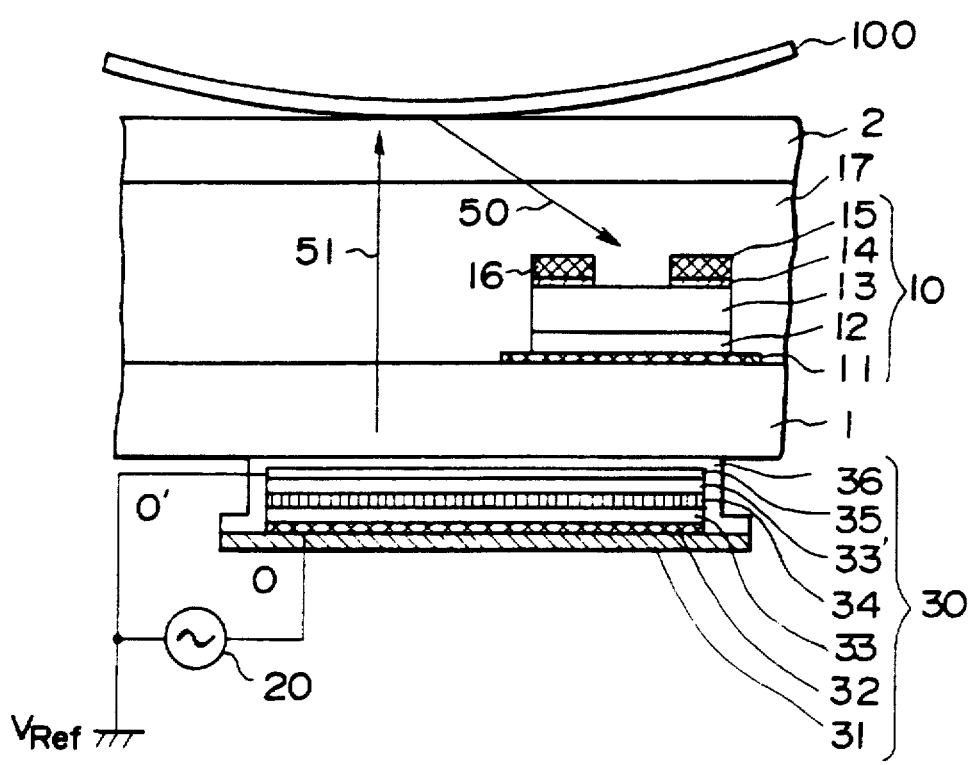
FIG. 10 is a diagrammatic cross-sectional view of the image sensor incorporating a first embodiment of the EL device, according to the present invention.

FIG. 10 is a diagrammatic cross-sectional view of the image sensor incorporating a first embodiment of the EL device, according to the present invention. As FIG. 10 and FIG. 1 have several features in common, the same reference numerals are utilized to denote them.

As shown in FIG. 10, a photosensor element 10 is fabricated by patterning and stacking a nontransparent lower electrode 11 made of a metal, such as Al, serving as a shield by shutting off direct illumination light, an insulating layer 12 made of $SiO_x$, $SiN_x$ or the like, a semiconductor layer 13 made of a-Si:H or the like, a doped layer 14 for making an ohmic contact, and main electrodes 15, 16 (a source and a drain), in that order from the bottom on a transparent substrate 1 made of glass or the like. When reflected light 50 from a document 100 reaches the semiconductor layer 13 between the main electrodes 15, 16, via a transparent insulating layer 2 and an intermediate resin layer 17, a photoelectric current starts flowing between the main electrodes.

An EL device 30 is formed of a sandwich structure by stacking a non-transparent metal electrode 32 made of a metal such as Al, an insulating layer 33 made of $Y_2O_3$, $SiN_x$, $BaTiO_2$ or the like, an EL emission layer 34 made of ZnS:Mn or the like, another insulating layer 33' made of the material identical to that of the first insulating layer 33, and a transparent electrode 35 made of ITO, $In_2O_3$, $SnO_2$ or the like in that order, from the bottom up, on a substrate 31. The sandwich structure is then covered with a protective film 36.

In FIG. 10, an EL driving power supply 20, as a driving voltage application means, provides the metal electrode 32 with a driving signal, with the transparent electrode 35 of the EL device 30 connected to a reference voltage supply $V_{REF}$ at its ground potential side. The ground potential level of the transparent electrode 35 is at the same level as the potential level (not shown) of the photoelectric transfer section including the photosensor element 10. The above arrangement means that an electrically grounded electrode is disposed between the EL device 30 and the photoelectric transfer section.

This assures that no electric field is present between the EL device 30 and the photoelectric transfer section, even in the presence of an EL device 30 driving signal of 100–250 V, 50 Hz–5 kHz in the vicinity of the photoelectric transfer section. Therefore, there are no sources of noise which could affect signals such as photoelectric currents flowing through the photosensors or voltages developed across storage capacitances. Each line of full width of picture information can thus accurately be picked up from the document.

In this embodiment of the image sensor, light 51 emitted by the light source, after passing through the transparent substrate 1 of the photoelectric transfer section, directly illuminates the document 100, and light 50 reflected and scattered by the document 100 is then received by the photosensor element 10 where the light 50 is converted into an electric signal. In this arrangement, the photoelectric transfer section is closest to the document 100, with the EL device 30, functioning as a light source, disposed slightly further away from the document 100.

For the purpose of minimizing optical transmission loss, an adhesive is employed between the EL device 30 and the transparent substrate 1 of the photoelectric transfer block, securing the EL device 30 in place. The refractive index of the adhesive is made nearly equal to that of the transparent substrate 1, so that the possibility of reflection and refraction of illumination light, emitted by the EL 30, at the interface of the transparent substrate 1, is minimized.

Figure 11:
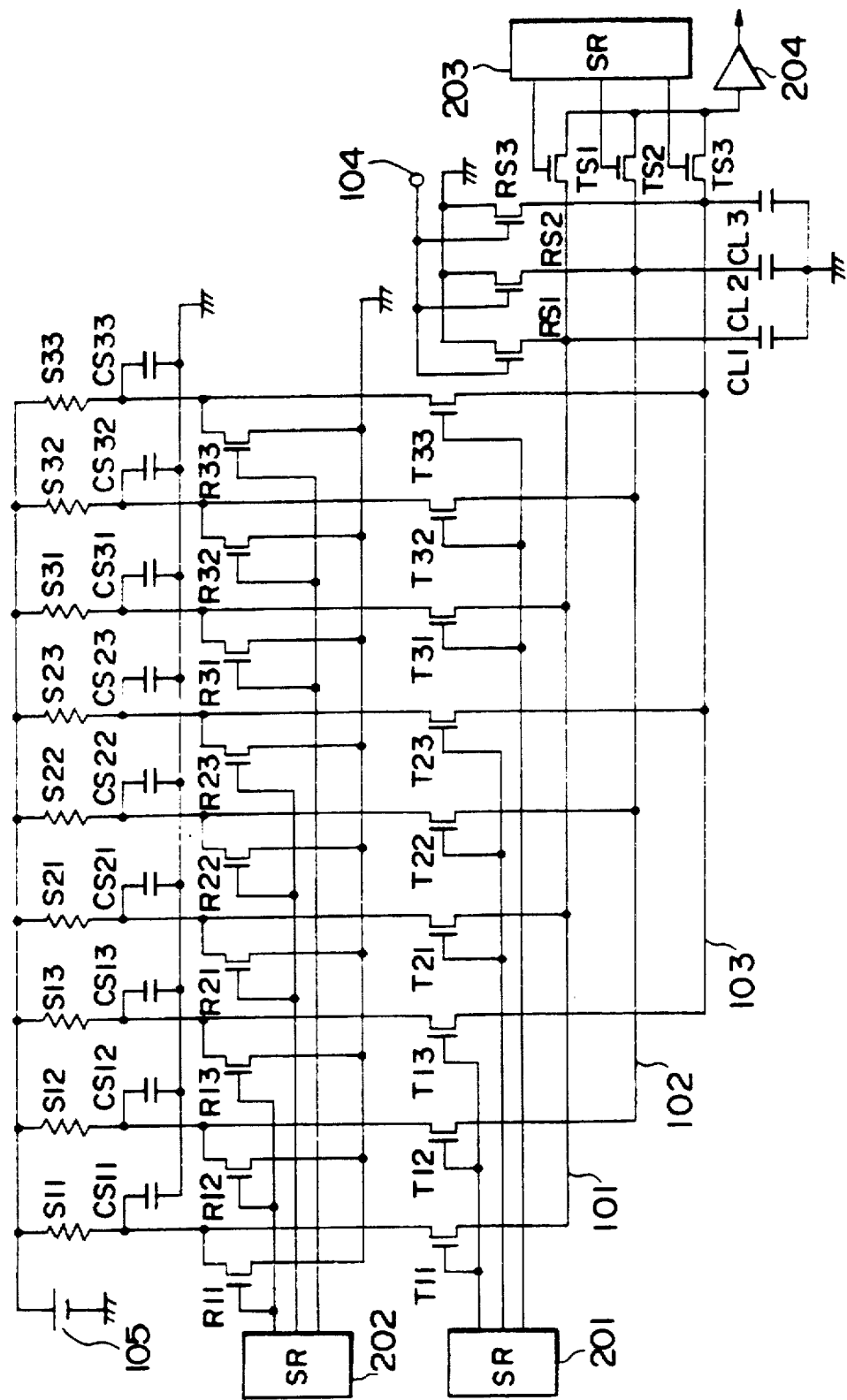
FIG. 11 is a schematic diagram of the first embodiment of the image sensor according to the present invention.

The photoelectric current developed between the main electrodes 15, 16, is picked up as an electric signal by a circuit made of storage capacitances and thin film transistors as shown in FIG. 11. A case shown in FIG. 11 is a photoelectric transfer section having nine photosensors.

In FIG. 11, photosensors S11–S33 are grouped into three blocks, each block having three photosensors, and three blocks make up one photosensor array. The photosensors S11–S33 are associated, respectively, with storage capacitances CS11–CS33, and switching transistors T11–T33.

Each of the switching transistors T11–T33 works in a manner that one photosensor within a block is connected to a photosensor in the next block which has the same serial number counted within that block as that of the first photosensor. Thus, as shown in FIG. 11, the electrodes of the identically serial-numbered photosensors are connected together to a common line 101, 102, or 103.

The operation of the photoelectric transfer section constructed as above is described below.

Each of the photosensors S11–S33 receives light, and, in response to the intensity of the input light, each of capacitors CS11–CS33 is charged by a power supply 105. A first parallel output terminal of a shift register 201 presents a high level output, causing switching transistors T11 through T13 to be conducting.

With switching transistors T11 through T13 conducting, charges stored in capacitors C11 through C13 are transferred, respectively, to capacitors CL1 through CL3.

A shift register 203 presents a high level output on its output terminal sequentially, causing switching transistors TS1 through TS3 to sequentially be conducting.

Picture information picked up in the form of light by the first block of the photosensors is transferred to and stored by capacitors CL1 through CL3, and is then read out by an amplifier 204. When the first block's information is read out, a high level signal is applied to a terminal 104, causing switching transistors RS1 through RS3 to be simultaneously conducting.

This operation allows capacitors CL1 through CL3 to be completely discharged, with their residual charges removed.

When the residual charges are fully removed from capacitors CL1 through CL3, the shift register 201 shifts providing a high level output at its second parallel output terminal. This causes switching transistors T21 through T23 to be conducting, and charges stored in the second block's capacitors CS21 through CS23 are transferred, respectively, to capacitors CL1 through CL3. Simultaneously, a shift register 202 provides a high level output at its first parallel output terminal, causing switching transistors R11 through R13 to be conducting, and subsequently removing the residual charges from capacitors CS11 through CS13.

The discharge operation of the capacitors CS11 through CS13 of the first block is thus performed in parallel with the transfer operation in which the charges stored in the capacitors CS21 through CS23 of the second block are transferred, respectively, to the capacitors CL1 through CL3. In the same manner as in the first block, each of switching transistors TS1 through TS3 is sequentially switched on as a result of the shifting output of the shift register 203, and the picture information stored in the second block is thus sequentially read out.

Similarly, the charge transfer operation of the third block is performed in parallel with the discharge operation of the capacitors CS21 through CS23 of the second block. The above procedure is repeated.

In this image sensor embodiment, which remains directly in contact with a document when in use, and which comprises no image formation system, an EL device functioning as a light source is typically disposed close to the photoelectric transfer section. The present invention is particularly useful in such an arrangement where noise developed by the EL device could adversely affect the sensor.

The same is true in an image sensing apparatus with an image formation system, though the image sensing apparatus described above dispenses With any image formation system.

[Embodiment 2]

Figure 12:
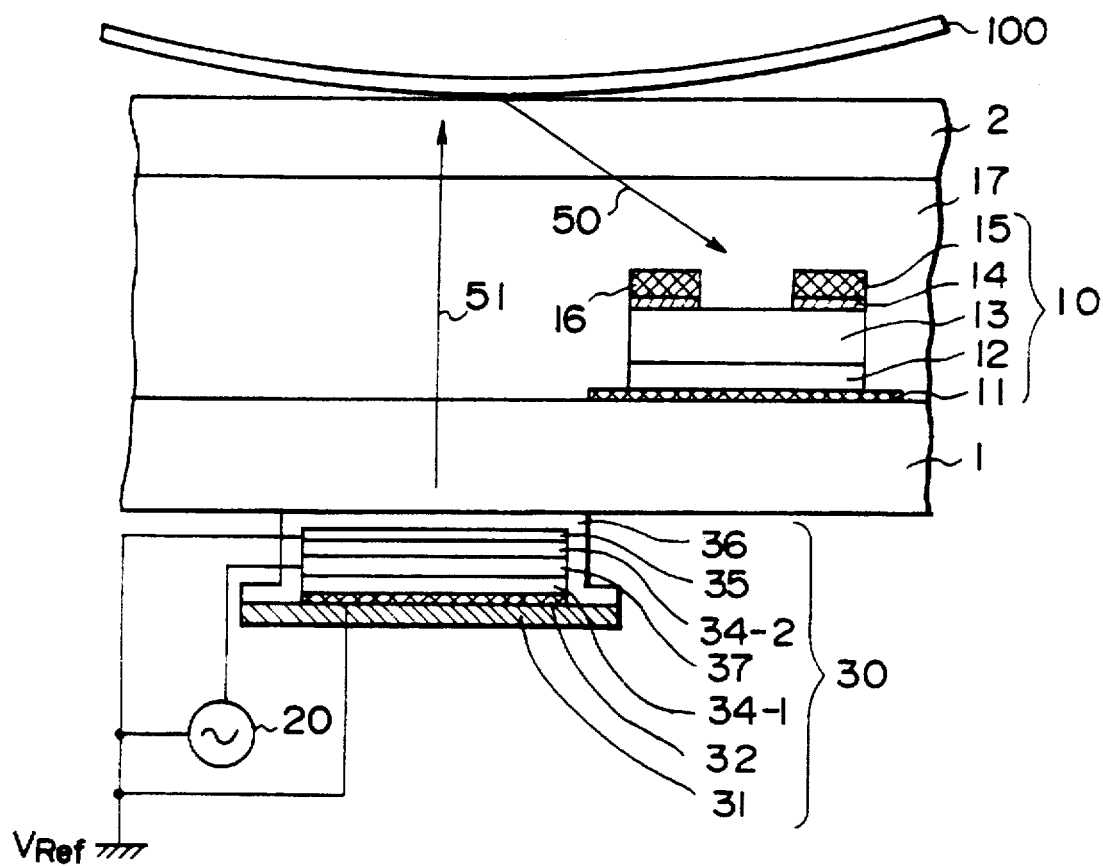
FIG. 12 is a diagrammatic cross-sectional view of the image sensor incorporating a second embodiment of the EL device, according to the present invention.

FIG. 12 is a diagrammatic cross-sectional view of the image sensor incorporating a second embodiment of the EL device, according to the present invention. In FIG. 12, the same reference numerals are utilized to denote identical features used in the first embodiment illustrated in FIG. 10. Since the basic structure of the image sensing apparatus in this embodiment remains unchanged from the first embodiment, only an EL device 30 is described below because it is different from that in the first embodiment.

The EL device 30 is fabricated by stacking an aluminum first metal electrode 32, a first EL emission layer 34-1, made of ZnS:Mn, a transparent third electrode 37, a second EL emission layer 34-2 made of ZnS:Mn like the first EL emission layer 34-1, and a transparent second electrode 35 made of $In_2O_3$ or the like in that order, from the bottom up, on a substrate 31. The EL device 30 is covered with a protective film 36 made of ethylene trifluoride.

In the above arrangement, both the metal first electrode 32 and the transparent second electrode 35 are connected to the reference electrode $V_{REF}$, at its ground potential side. An EL driving power supply 20 as a driving voltage application means supplies a high frequency driving signal of 1 kHz, 100 V to the transparent electrode 37 interposed between the first and second EL emission layers 34-1, 34-2. An electric field developed by the driving signal is applied to the first EL emission layer 34-1 disposed between the transparent third electrode 37 and the metallic first electrode 32. The electric field is also applied to the second EL emission layer 34-2 disposed between the transparent third electrode 37 and the transparent second electrode 35. Both the first and second EL layers 34-1, 34-2 therefore emit light. About half the quantity of light emitted by the first EL emission layer 34-1 is transmitted through the transparent third electrode 37 and the second EL emission layer 34-2, and then output by the transparent second electrode 35. The rest of the light from the first emission layer 34-1 is reflected by the metal first electrode 32, and output by the transparent second electrode 35 after similar transmission through the transparent third electrode 37 and the second EL emission layer 24-2. The transparent second electrode 35 thus outputs the combined light, a portion of which is generated by the first EL emission layer 34-1 and the rest of which is generated by the second EL emission layer 34-2; thus, even with slight absorption loss by the EL emission layers and other layers considered, a resulting light quantity is almost twice as large as that obtained from a single EL layer construction.

Since the first and second electrodes 32, 35 on both sides of the third electrode 37 are grounded, no electric field generated by the driving signal escapes outwardly, thereby presenting no electromagnetic interference.

It may be perfectly acceptable to interpose an insulating layer made of $Si_3N_4$, $Y_2O_3$, $SiO_2$ or the like between an electrode and an EL emission layer as appropriate, as in the first embodiment, as long as the resulting structure basically agrees with this embodiment. To enhance the moisture resistant characteristic of an EL device, a moisture absorption layer may be interposed beneath a protective layer.

In the same manner as in the first embodiment, the photoelectric current developed between the main electrodes 15, 16 of a photosensor element in FIG. 12 is read out as an electric signal by the electrical circuit made up of storage capacitances and thin film transistors shown in FIG. 11.

According to the embodiments 1 and 2, as detailed above, grounded electrodes shield members disposed in the vicinity of an EL device from noise generated by an EL device driving signal, suppressing the adverse effect of noise.

In an image sensor using such an EL device as a light source, the output of the photoelectric transfer section may be kept free from noise generated by the EL device in a structure available at low cost.

According to the embodiments 1 and 2, by allowing both a first EL emission layer and a second EL emission layer to emit light with a first electrode and a second electrode grounded, and with a third electrode provided with a voltage, noise generated by an EL device is shut off by the grounded electrodes, preventing the noise from adversely affecting the members disposed in the vicinity of the EL device. Furthermore, since the light, emitted by one EL emission layer and transmitted through the third electrode, is added to the light emitted by the other EL emission layer, a resulting light quantity is almost twice as large as that of the prior art.

In an image sensor using such an EL device as a light source, the driving signal of the EL device does not escape outward, presenting no interfering noise to the image sensor. A resulting light quantity is almost doubled, substantially enhancing a resulting image. As a result, a high S/N ratio image sensor may be fabricated.

[Embodiment 3]

Referring to the drawings, a third embodiment of the present invention is described below.

Figure 13:
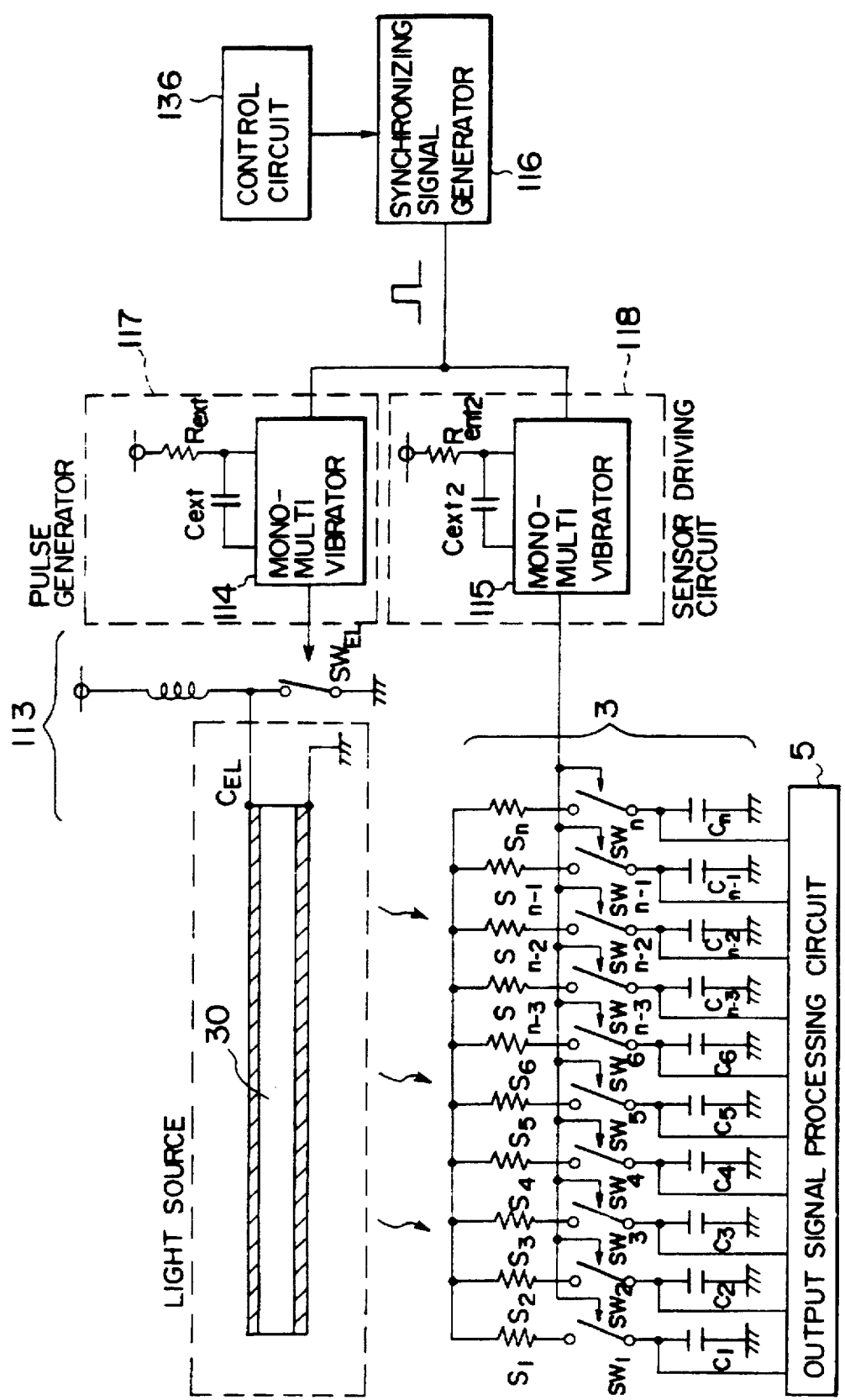
FIG. 13 is a diagram illustrating a third embodiment of the image sensor according to the present invention.

FIG. 13 is a schematic diagram showing the third embodiment of the image sensor according to the present invention.

In the figure, a separate excitation type EL driver 113 generates an alternating current using the EL device's own capacitor components. Monostable multivibrators 114, 115 generate, at the timing of a trigger input, pulses having an appropriate duration determined by the values of C and R. In response to a control signal from a control circuit, a synchronizing signal generator 116 generates a synchronizing signal. FIGS. 14(a)–(f) show waveforms of related points of the circuit.

The operation of this embodiment of the photoelectric transfer section is described below.

In response to the control signal coming from the control circuit 136, the synchronizing signal generator 116 generates a synchronizing signal 119 illustrated in FIG. 14(a). At the timing of the synchronizing signal 119, a pulse generator 117 made of the monostable multivibrator 114, a capacitor $C_{ext}$ and a resistor $R_{ext}$, as shown in FIG. 13, generates an EL driving pulse (120 in FIG. 14) having a duration $\tau 1 = C_{ext} R_{ext}$, during which the switch $SW_{EL}$ of the separate excitation type EL driver 113 is opened.

Along with the open and close operations of the switch $SW_{EL}$, the separate excitation type EL driver develops an alternating electric field 121 in FIG. 14(c), by means of the EL device's own capacitance component $C_{EL}$, thereby causing the EL device 30 to emit light to illuminate a document.

Similarly, in response to the synchronizing signal 119, the monostable multivibrator 115 of a sensor driving circuit 118 generates a pulse 123 having a duration $\tau 2 = C_{ext2} \times R_{ext2}$, equal to storage time. This pulse 123 causes switches $SW_1$–$SW_n$ in FIG. 13 to simultaneously open or simultaneously close, thereby allowing charges, generated in response to light 50 reflected from the document, to be stored in capacitors $C_1$–$C_n$.

The charges stored in the capacitors $C_1$–$C_n$ are then converted, by an output signal processing circuit 5 in FIG. 13, into an output signal whose waveform is indicated at 124 in FIG. 14(f). This completes a reading operation of one line of the document.

A waveform 122 in FIG. 14(d) shows an EL light emission quantity over the document per storage time. By means of the synchronizing signal 119, the reading operation on each line of the document is synchronized with the illumination operation of the document, and integrated light quantities 122-1, 122-2 are kept constant.

As detailed above, in the separate excitation type EL driver 113, using the EL device's own capacitance component $C_{EL}$ as in FIG. 13, a synchronizing operation is readily achieved.

In a synchronizing operation as above, an EL device 30 is not driven at an unnecessarily high frequency, thereby preventing the EL device from suffering a rapid deterioration in its light emission quantity.

The above embodiments employ a storage type reading sensor 3 which is made up of a capacitor and a photoelectric device characterized by its variation of resistance in accordance with input light. Alternatively, the storage type reading sensor may be formed of a capacitor and a photovoltaic device such as a photodiode.

[Embodiment 4]

Figure 15:
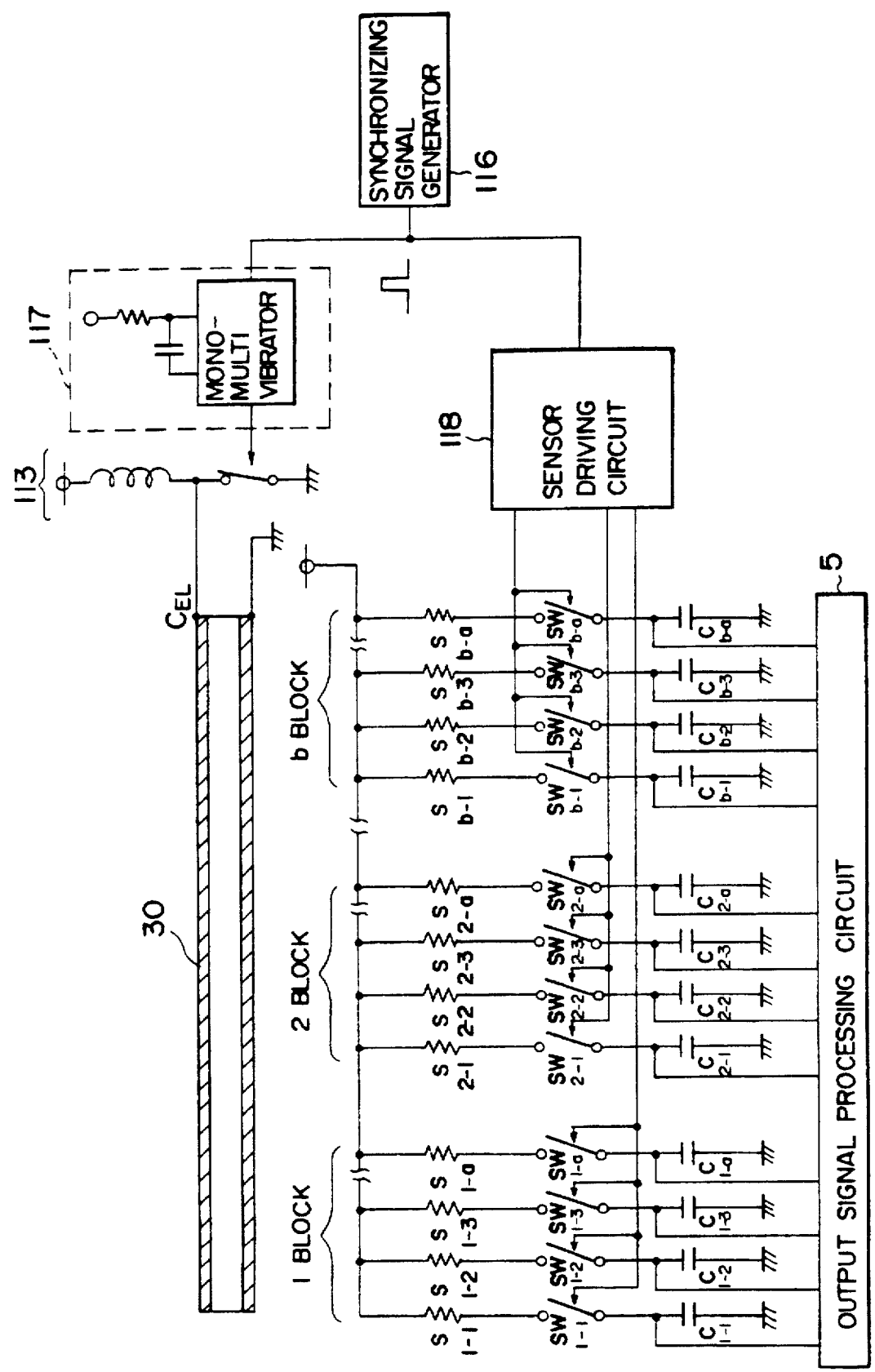
FIG. 15 is a diagram illustrating a fourth embodiment of the image sensor according to the present invention.

FIG. 15 is a schematic diagram illustrating a fourth embodiment of the image sensor according to the present invention. FIGS. 16(a)–(f) and FIGS. 17(a)–(b) illustrate waveforms at related points in the schematic diagram in FIG. 15. In this embodiment, a total of "n" photosensors arranged in a row, is grouped into "b" blocks, each block having "a" photosensors. Thus, n equals a×b. Each block performs its reading operation, i.e., charging operation, at a different timing, from block to block.

In the same manner as in the embodiment 3, a synchronizing signal 119' generated by a synchronizing signal generator 116 causes a pulse generator 117 to output a pulse with a proper duration to a separate excitation type EL driver 113. Also, in response to the synchronizing signal 119', a sensor driving circuit 118 feeds a driving pulse with its waveform 123' illustrated in FIG. 16(e), to each of the blocks.

According to such a synchronizing operation, in a burst driving photoelectric transfer device wherein the photosensors on a single line are grouped into a plurality of blocks, each block performing a reading operation at a different timing from the remaining blocks, integrated light quantities 122'-1, 122'-2, 122'-3, 122'-4 are kept constant.

In the burst driving photoelectric transfer device, when each block has a storage timing 125 in FIG. 17(a), an EL device is activated for light emission during a period (waveform 126) equal to a block storage time divided by an integer number (5 in FIG. 17(b)), and the integrated light quantity of each block is kept constant.

According to the embodiments 3 and 4, the use of a simple circuit eliminates variations of light quantity due to the storage timing of a storage type reading sensor, and an original picture is thus closely approximated in its reproduction.

Unlike the prior art, an image sensor according to the present invention employs no costly driving circuit, and suffers no rapid deterioration of EL device light emission. Therefore, a compact image pickup device with excellent performance may be fabricated.

It is noted that, in FIG. 10 and FIG. 12, if the members quoted as reference numerals 1, 2 and 10 are replaced with a known liquid crystal display device or a known liquid crystal shutter, the image sensor may become a liquid crystal display apparatus.

It is also noted that if the driving method employed in the embodiment 3 or 4 is applied to drive the EL device and the photosensor in the embodiment 1 or 2, an image sensor may be obtained having all the above-mentioned advantages combined.

What is claimed is:

1. A liquid crystal device having a light source and liquid crystal elements which selectively transmit light emitted by the light source, said liquid crystal device comprising:

the light source, being an electroluminescent device, having a transparent electrode disposed on a light output side of the light source, an electrode opposite to the transparent electrode, and an electroluminescence emission layer interposed between the transparent electrode and the opposite electrode;

voltage supply means connected to the transparent electrode in order to feed a reference voltage to the transparent electrode; and driving voltage application means for applying a driving voltage to the opposite electrode, said driving voltage application means comprising a separate excitation type driving circuit using a capacitance of said electroluminescent device itself to produce an alternating current, and pulse generating means for generating a pulse responsive to an input signal to turn on and off a switch of said separate excitation type driving circuit, wherein said pulse generating means comprises a multivibrator and a capacitor and a resistor determine a width of the pulse.

2. A liquid crystal device having a light source and liquid crystal elements which selectively transmit light emitted by the light source, said liquid crystal device comprising:

the light source, being an electroluminescent device, having a transparent electrode disposed on a light output side of the light source, an electrode opposite to the transparent electrode, and an electroluminescence emission layer interposed between the transparent layer and the opposite electrode;

a voltage source connected to the transparent electrode in order to feed a reference voltage to the transparent electrode; and a driving circuit for applying a driving voltage to the opposite electrode, said driving voltage application means comprising a separate excitation type driving circuit using a capacitance of said electroluminescent device itself to produce an alternating current, and pulse generating means for generating a pulse responsive to an input signal to turn on and off a switch of said separate excitation type driving circuit, wherein said pulse generation means comprises a multivibrator and a capacitor and a resistor determine a width of the pulse.

* * * * *